United States Patent
Heinrich et al.

(10) Patent No.: US 6,542,995 B2
(45) Date of Patent: *Apr. 1, 2003

(54) APPARATUS AND METHOD FOR MAINTAINING SECURED ACCESS TO RELOCATED PLUG AND PLAY PERIPHERAL DEVICES

(75) Inventors: David F. Heinrich, Tomball, TX (US); Hung Q. Le, Katy, TX (US)

(73) Assignee: Compaq Information Technologies Group, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/196,800

(22) Filed: Nov. 20, 1998

(65) Prior Publication Data

US 2002/0194486 A1 Dec. 19, 2002

(51) Int. Cl.[7] .................................................. H04L 9/00
(52) U.S. Cl. ..................................................... 713/202
(58) Field of Search ................................. 713/202, 200

(56) References Cited

U.S. PATENT DOCUMENTS

| | | | | |
|---|---|---|---|---|
| 5,552,776 A | * | 9/1996 | Wade et al. ............ 340/825.31 |
| 5,758,099 A | | 5/1998 | Grieco et al. |
| 5,778,071 A | * | 7/1998 | Caputo et al. ................ 380/25 |
| 5,857,083 A | * | 1/1999 | Venkat ........................ 385/309 |
| 6,141,690 A | * | 10/2000 | Weiman ...................... 709/228 |
| 6,145,085 A | * | 11/2000 | Tran et al. .................. 713/202 |
| 6,205,503 B1 | * | 3/2001 | Mahalingam ............... 710/103 |
| 6,301,665 B1 | * | 10/2001 | Simonich et al. ........... 713/200 |

* cited by examiner

Primary Examiner—Gail Hayes
Assistant Examiner—Leynna Ha
(74) Attorney, Agent, or Firm—Kevin L. Daffer; Conley, Rose P.C.

(57) ABSTRACT

A computer system, bus interface unit, and method are provided for securing certain Plug and Play peripheral devices connected to an ISA bus. Those devices include any device which contains sensitive information or passwords. The device may be encompassed by or interfaced through adapter cards which can be readily inserted into sockets and thereafter relocated to dissimilar sockets. A security device within the bus interface unit keeps track of identifying information of various Plug and Play ISA devices inserted and re-inserted into slots connected to the ISA bus. As a peripheral device or card is moved, an identifying number associated with that device is maintained in a device identification register within the bus interface unit. Moreover, the base address of that device address space is also maintained in I/O address registers contained within the bus interface unit. The device identification registers and I/O address registers are deemed shadowing registers to which future ISA cycles are compared. If an ISA read or write cycle is destined for a secured peripheral device denoted by its shadowed status within the shadowing registers, then securing of that device is achieved regardless of where that device is plugged into a corresponding socket location. In this manner, securable device identification numbers and base addresses can be kept track of (shadowed) such that the shadowing information will purposely mask accesses to relocated ISA Plug and Play secured devices and/or slots.

20 Claims, 5 Drawing Sheets

APPARATUS AND METHOD FOR MAINTAINING SECURED ACCESS TO RELOCATED PLUG AND PLAY PERIPHERAL DEVICES

BACKGROUND OF THE INVENTION

1. Field of the Invention

This invention relates to computer system security and, more particularly, to a device and method for preventing access of a secured plug and play peripheral device (or address range within the peripheral device) whose base address has been modified.

2. Description of the Related Art

Contained within a portion of the computer system non-volatile memory is a program often referred to as Basic Input/Output System ("BIOS"). BIOS is the interface between the computer system hardware and the operating system and applications software. The BIOS is generally run at boot-up in order to establish the serial and parallel ports, test memory, and generally determine the overall hardware configuration of the computer system. Thereafter, the processor within the computer system is instructed to read the operating system software (and eventually the applications software) from a configured disk drive.

In order to configure various hardware resources during boot-up, it is necessary that the input/output ("I/O") address space of each hardware resource be assigned. This may entail writing an I/O address space to a register assigned to that hardware resource. Typically, the configuration register of each resource is contained on the same card as the interface to that resource so that whenever accesses occur, those accesses are immediately mapped to the corresponding resource.

Many types of hardware resources contain sensitive data and/or instructions. Those hardware resources are often linked to peripheral buses within the computer system, and are henceforth referred to as "peripheral devices". For example, a computer system may employ several peripheral buses, such as an Integrated Drive Electronics ("IDE") bus, a Peripheral Component Interface ("PCI") bus, and/or an Industry Standard Architecture ("ISA") bus. A peripheral device, such as a disk drive, can reside upon the IDE bus and may contain sensitive information that must be periodically secured against unauthorized access. Certain information accessible across a serial port, a parallel port, or contained within a floppy disk drive, and commonly linked to an ISA bus may also be securable. Passwords stored within static RAM, linked to the ISA bus must be maintained private to only the individual or individuals who are authorized to examine or modify those passwords. The static RAM attributed to a computer system is often referred to as CMOS RAM.

The desire to maintain security to certain peripheral devices connected to a peripheral bus, for example the ISA bus, becomes particularly acute with the advent of what is commonly known as "Plug and Play" devices. Set forth in the "Plug and Play ISA Specification" Version 1.0a, May 5, 1994, copyright Intel and Microsoft Corporation (herein incorporated by reference and henceforth referred to as the "Specification"), the interface to various peripheral devices can be configured upon an adapter card and merely plugged into slots associated with the computer system. In the example provided, the slots are connected to the ISA bus such that a user interface adapter, a memory media adapter, and various other adapters can be easily and quickly plugged into numerous slots associated with the ISA bus. A popular ISA adapter includes what is often referred to as a "Super I/O" adapter. The Super I/O is essentially an application specific chip, a suitable such chip obtainable from National Semiconductor Corporation as part no. PC87310.

The ease by which hardware resources and, more specifically, ISA peripheral devices (interchangeably referred to as either the devices themselves or as "cards" containing an interface to the devices) can be connected to the ISA bus poses numerous security concerns. For example, a peripheral device, once secured to a slot that is secured, may not remain secured if that peripheral device is re-assigned to a dissimilar slot during removal of its associated adapter card and re-insertion of that card into another slot. Additionally, a peripheral device which is presently secured is often protected against unwarranted accesses to that particular device's I/O address space. However, if that device is removed from its slot and another device inserted, the second device will be secured even though it may be desirable that it not be secured. It would therefore be beneficial to introduce a computer security system which can maintain security to Plug and Play peripheral devices even though those devices are moved. Moreover, it would be of further benefit to disable security of a slot previously occupied by a secured device, but re-assigned to a device that is not to be secured. The flexibility of re-assigning security controls within an existing Plug and Play ISA system would present a beneficial advancement over conventional, non-flexible (or fixed) security assignments.

SUMMARY OF THE INVENTION

The problems outlined above are in large part solved by an improved computer security system hereof. The security system can flexibly secure I/O address spaces to take advantage of modifications allowed by the Plug and Play architecture. Securement can apply to any peripheral device, such as an ISA device. Securing ISA devices, such as the Super I/O device, is achieved by placing security components within a southbridge of the computer system. The southbridge includes a password store and compare unit which retrieves passwords stored in non-volatile memory during computer boot-up, and compares those stored passwords against user-entered passwords. The password store and computer unit is interchangeably referred to as a "black box". This description of a black box security device is generally well-known, and set forth in, for example, U.S. Pat. No. 5,748,888 (herein incorporated by reference).

Also contained within the southbridge is a configuration control unit. Upon receiving an initialization key, the configuration control unit isolates each Plug and Play device (i.e., device or card) upon, e.g., the ISA bus and assigns a unique identifier number to each of those respective devices. The identifier number is contained within a register proximate to its respective device. Additionally, the identifier number is contained within a shadow register or device identification register located within the southbridge. For each peripheral device, a corresponding device identification register and unique identifying number is present.

Further embodied upon the southbridge is a security control unit. The security control unit, similar to the configuration control unit, is coupled to the peripheral bus (e.g., ISA bus) and receives a configuration command, or wake command, transmitted across the peripheral bus. The configuration command will cause all peripheral devices that have an identifying number which matches the subsequent write data to transition from a sleep state to possibly a configuration state. Within the configuration state, configuration registers associated with corresponding peripheral devices can be configured with an I/O address range. The configuration registers are assigned to respective peripheral devices and are usually attributed to adapter cards on which those devices reside. The configuration registers are programmed during the configuration state, when boot-up occurs. In addition to programming the configuration registers, the I/O address spaces of respective peripheral devices are also programmed into shadow registers, or I/O address registers, contained within the southbridge.

The device identification registers and I/O address registers shadow or track configuration information stored within configuration registers upon respective adapter cards. However, by placing the configuration information within the southbridge via the shadow registers, allowance of subsequent accesses to particular peripheral devices and to particular I/O base addresses can be made within the southbridge. Accordingly, the security control unit includes a protection comparator which compares, e.g., ISA bus transaction addresses to base addresses and identifying numbers stored within the shadow registers to determine if those corresponding base addresses and identifying numbers represent secured devices. If so, masking logic will prevent reads and writes from being sent to the secured devices being addressed.

The password store and compare unit, or black box, serves to identify which of the peripheral devices is to be secured. If the black box output yields a lock signal, then the masking logic, upon receipt of the lock signal, will block or mask the reading or writing of ISA data. However, if the black box yields and unlock signal, then the masking logic will allow the read and write ISA data to proceed. Accordingly, the masking logic maintains control over the read/write command upon the ISA bus.

According to one embodiment, a computer system is provided. The computer system includes a microprocessor and a Plug and Play peripheral device located separate from a printed circuit board on which the microprocessor resides. The peripheral device includes a base address which is secured against access. A shadowing comparator is coupled to detect modifications to the base address of the peripheral device upon receiving a configuration command, or Wake command, issued by the computer system. An I/O address register is coupled to the shadowing comparator for storing the modified base address. Masking logic is operably coupled to the address registers for preventing access to the modified base address of the peripheral device. Thus, even though the base address of a peripheral device is modified, security of that device is maintained.

The computer system may further include a keyboard, and a storage unit operably coupled between the keyboard and the masking logic for forwarding an unlock signal to the masking logic if a stored password within the storage unit favorably compares with a password entered upon the keyboard. Upon receiving the unlock signal, the masking logic will allow access to the base address of the peripheral device.

According to another embodiment, the computer system includes a plurality of peripheral devices responsive at select times to entry upon the keyboard. A security control unit is operably linked to a peripheral bus on which a secured group of the plurality of peripheral devices are coupled. The security control unit is adapted to detect a change in I/O addresses associated with the secured group of peripheral devices and to prevent accesses to the secured group of peripheral devices before and after the I/O addresses associated therewith are changed.

According to yet another embodiment, a method is provided for securing a peripheral device within a computer system. The method includes associating an I/O address of a Plug and Play ISA peripheral device as one that is secured. A change in the I/O address can then be detected, and the changed I/O address can be stored. The changed I/O address may be recalled whenever access to the peripheral device is attempted. Those accesses can be prevented by associating the changed I/O address as one that is to remain secured.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
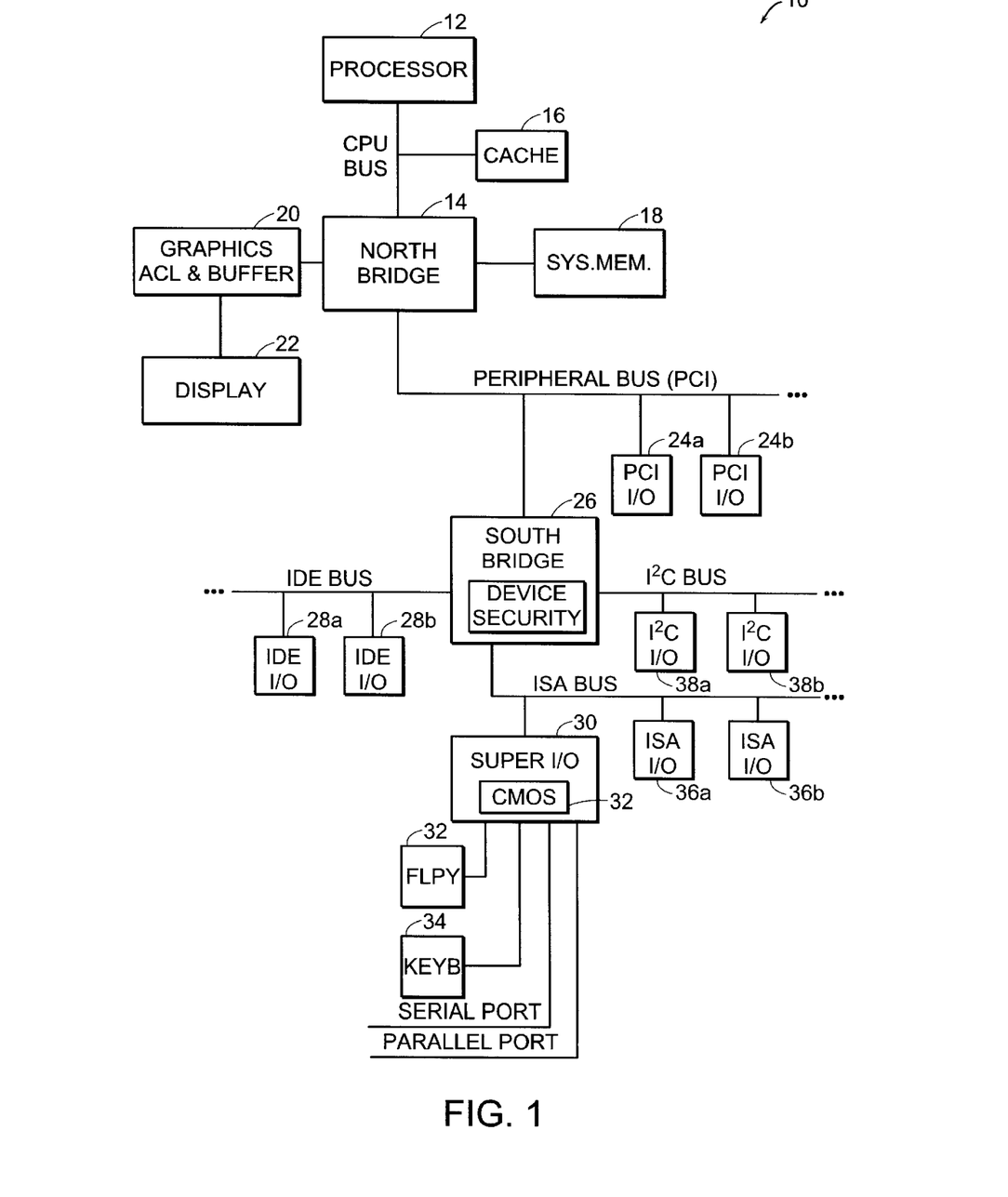
FIG. 1 is a block diagram of a computer system comprising various buses and bus interface units.

Turning to the drawings, FIG. 1 illustrates a computer 10 having multiple buses, including a CPU bus, a mezzanine or PCI bus, and multiple peripheral buses. In the example shown, the peripheral buses include an ISA bus, an IDE bus and a I$^2$C bus. The CPU bus connects a CPU or processor 12 to a bus interface unit or northbridge 14. A cache memory 16 can be embodied within or external to CPU 12.

Northbridge 14 provides an interface between components clocked at dissimilar rates. According to one embodiment, northbridge 14 interfaces a slower PCI bus and a faster CPU bus. Northbridge 14 may also contain a memory controller which allows communication to and from system memory 18. A suitable system memory 18 comprises DRAM or synchronous DRAM ("SDRAM"). Northbridge 14 may also include graphics support to allow communication to a graphics accelerator and buffer 20. A graphics support, included within an advanced graphics port such as the Accelerated Graphics Port (AGP), provides a high performance, component level interconnect targeted at three dimensional graphics display applications and is based on performance extensions or enhancements to PCI.

AGP interfaces are generally standard in the industry, the description of which is available from Intel Corporation. Generally speaking, AGP is physically, logically, and electrically independent of the PCI bus and is intended for the exclusive use of a display device 22. Display 22 is any electronic display upon which an image or text can be presented. A suitable display 22 includes a cathode ray tube (CRT), a liquid crystal display (LCD), etc.

Northbridge 14 is generally considered an application specific chip set, or application specific integrated circuit (ASIC) that provides connectivity to various buses, and integrates other system functions such as memory interface and P1394. System memory 18 is considered the main memory and refers to a portion of addressable memory that the majority of memory accesses target. System memory 18 is considered the largest continuous memory space of computer 10.

Northbridge 14 contains various sub-components, some of which serve as an interface to processor 12, system memory 18 and the graphics accelerator or frame buffer associated with display 22. A PCI interface is also included within northbridge 14 to allow accesses to and from input/output (I/O) devices 24 connected to the PCI bus.

Also connected to the PCI bus is a southbridge 26. Southbridge 26, similar to northbridge 14, includes various interfaces or controllers connected to respective buses. In the example shown, a controller or interface exists within southbridge 26 to handle communication between devices on the PCI bus, the IDE bus, the ISA bus and the I$^2$C bus. The controllers, or interface units, serve to adapt transfer protocols from one bus to that of another. The interfaces also provide buffers to handle what could be substantially dissimilar transfer rates between buses.

Associated with each bus is a hardware resource, some of which do not need to be secured and some of which do. For example, the IDE bus includes peripheral devices 28, a popular IDE device being an IDE hard disk drive. Of course, numerous other peripheral devices may be connected to the IDE bus, and thereby granted access to computer system 10. In the example shown, an ISA bus is also connected to southbridge 26. According to known terminology, various controllers of multiple ISA type devices can be embodied upon a single monolithic substrate, deemed a super I/O 30. For example, a floppy drive 32, as well as keyboard 34, and the serial/parallel ports are coupled to the ISA bus via controllers within super I/O 30. Information regarding super I/O 30 can be obtained from, e.g., National Semiconductor Corp. For example, super I/O 30 can embody a real time clock (RTC) and a battery-backed CMOS RAM memory 32. The CMOS RAM memory, henceforth referred to as "CMOS" stores system configuration information and keeps track of the time of day (i.e., RTC). Of further significance, CMOS 32 may include a password that is maintained even if power to computer 10 is terminated. In addition to Super I/O 30, the ISA bus can accommodate other ISA peripheral devices 36. Those devices can be electromechanical devices, and include an interface or adapter card coupled between the ISA bus and the electromechanical units. The adapter cards can be ones which plug into specified slots which are operably connected to the ISA conductors. Thus, the adapter cards are Plug and Play adapter cards having logic for the Plug and Play protocol contained within an integrated circuit logic module mounted upon the adapter card itself. Details regarding the ISA Plug and Play protocol are set forth within the Plug and Play ISA Specification described above.

Coupled to southbridge 26 may be another peripheral bus, such as the I$^2$C bus. The I$^2$C bus is a fairly well documented peripheral bus having a recognized and understood bus transfer protocol, similar to the ISA bus and the IDE bus. An I$^2$C bus typically contains a serial data line and a serial clock line. Details regarding the I$^2$C bus protocol can be obtained, for example, from Phillips Semiconductors which make available numerous I$^2$C devices and illustrate connectivity of those devices with the I$^2$C bus protocol. Well known I$^2$C peripheral devices are shown in FIG. 1 as reference numeral 38.

Figure 2:
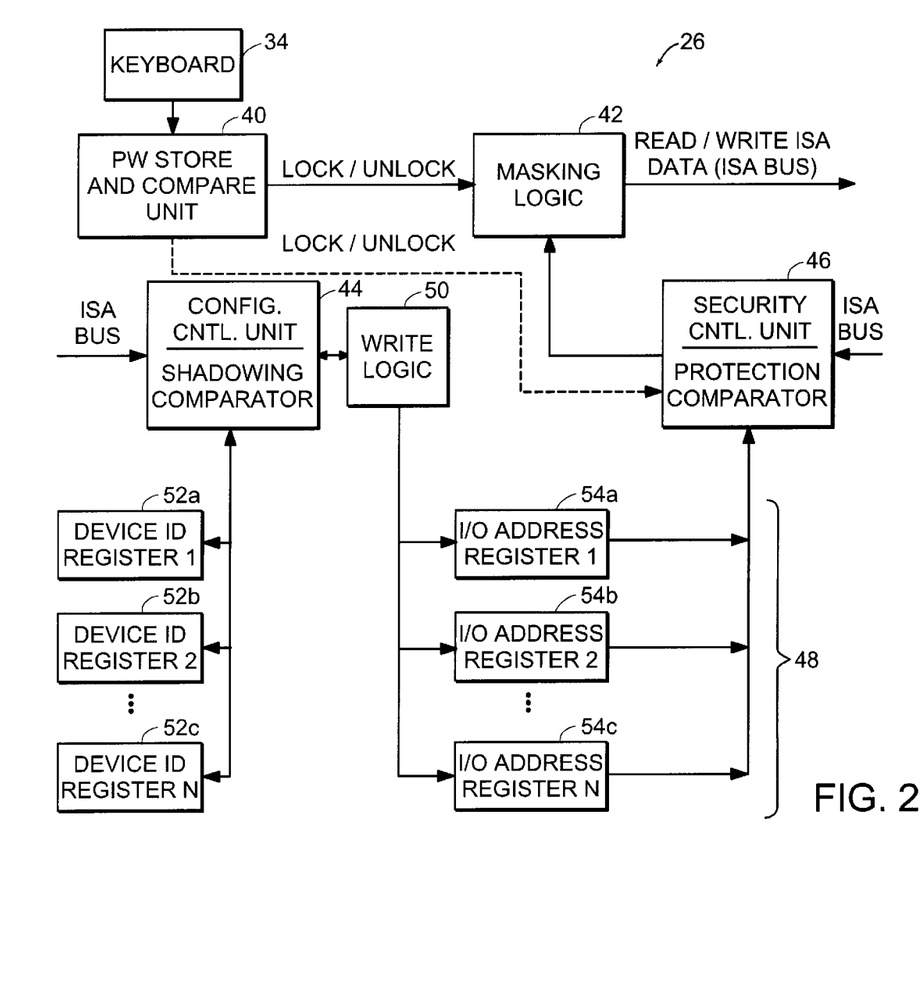
FIG. 2 is a block diagram of a security device within the south bridge of FIG. 1, wherein the security device includes a black box password store and compare unit, a configuration control unit, a security control unit, and masking logic which, in combination, shadows base addresses of securable I/O address spaces and grants access to certain securable I/O address spaces depending on the lock or unlock output of the black box.

Except for keyboard 34, FIG. 2 illustrates various components contained within southbridge 26. The components are shown in a block diagram as a security device which can be thought of as containing a black box 40, masking logic 42, configuration control unit 44, security control unit 46, and various shadow registers 48 and write logic 50.

During boot-up from BIOS, passwords within CMOS of the Super I/O or within non-volatile memory arranged upon the I$^2$C bus (shown in FIG. 1) are loaded into password store and compare unit 40. The stored password is then subsequently compared against any passwords entered upon the computer keyboard 34. If the keyboard entered password matches with a previously stored password loaded into black box 40, then an unlock signal is presented upon a respective slot or conductor output from black box 40. Black box 40 preferably comprises a command register and a decoder, a data/status register, a register file, and password verification or comparator logic. Also included within black box 40 is at least one slot to which various devices are operably coupled. In the example shown, one slot output conductor is routed to masking logic 42. The slot output can be fixed to the conductor input to masking logic 42, or the connection can be programmed via register mapping.

If an unlock signal is forwarded to masking logic 42, then regardless of the outcome from security control unit 46, all read/write transactions upon the ISA data bus to corresponding ISA peripheral devices or adapter cards can be undertaken. This essentially overrides the security to those devices. However, if the user entered password and the password loaded into black box 40 do not match, then a lock signal is presented to masking logic 42. The lock signal may be placed upon a specific slot or conductor dedicated to a particular ISA peripheral device. That device will remain locked until the passwords match, thereby preventing read/write data to be presented to that device via masking logic 42. Accordingly, FIG. 2 illustrates lock and unlock signals placed on dedicated slot outputs fed to respective inputs of masking logic 42. Masking logic 42 includes any logic which can selectively secure against accesses or data transactions to and from secured ISA Plug and Play peripheral devices. Forwarding a lock signal to masking logic 42 will essentially disable the read/write command signal so that a data transaction cycle will be ignored and thereby "masked" from the ISA peripheral device (or target).

If the masking logic is enabled through its receipt of a lock signal, then it is important that the appropriate Plug and Play device (including adapter card) be identified. FIG. 2 illustrates a configuration control unit 44 which identifies securable Plug and Play ISA peripheral devices by placing corresponding identifying information into shadowing registers 48 contained within southbridge 26. During boot-up or reset of the computer system 10 (shown in FIG. 1), southbridge 26 will receive commands upon the ISA bus which force certain ISA peripheral devices to become active, those devices being critical to the power-up operations and thus contain configuration and/or operating system information. The ISA peripheral devices not required for boot-up operation will come up inactive. Thereafter, the BIOS will be used to isolate an ISA peripheral device and assign a handle or identifying number to each peripheral device. That identifying number is placed within a register coupled to the adapter card associated with a corresponding peripheral device. Additionally, the identifying number is placed in a corresponding shadowing register within southbridge 26.

FIG. 2 illustrates numerous identification registers 52 which form a part of shadowing registers 48. Each register 52 is assigned to a particular peripheral device. The peripheral device nomenclature is interchangeably referred to as either a device or an adapter card, both of which are Plug and Play devices or cards. For example, register 52a may be assigned the same identifying number uniquely placed in a configuration register corresponding with a parallel port adapter card, etc. Depending on the number of peripheral devices connected to the ISA bus, a corresponding number of identification registers 52 will be present within southbridge 26.

Also included within shadowing registers 48 are I/O address registers 54. Similar to identification registers 52, I/O address registers 54 are assigned unique information for corresponding peripheral devices connected to the ISA bus. While registers 52 receive an identifying number, often referred to as a card select number, I/O address registers 54 receive information about the I/O address range for corresponding peripheral devices.

Registers 52 are programmed during an isolation state of a Plug and Play card configuration sequence, whereas registers 54 are programmed during an auto configuration state of that sequence. The configuration sequence and, more particularly, the isolation and configuration states are described in more detail in reference to the following figures.

Figure 3:
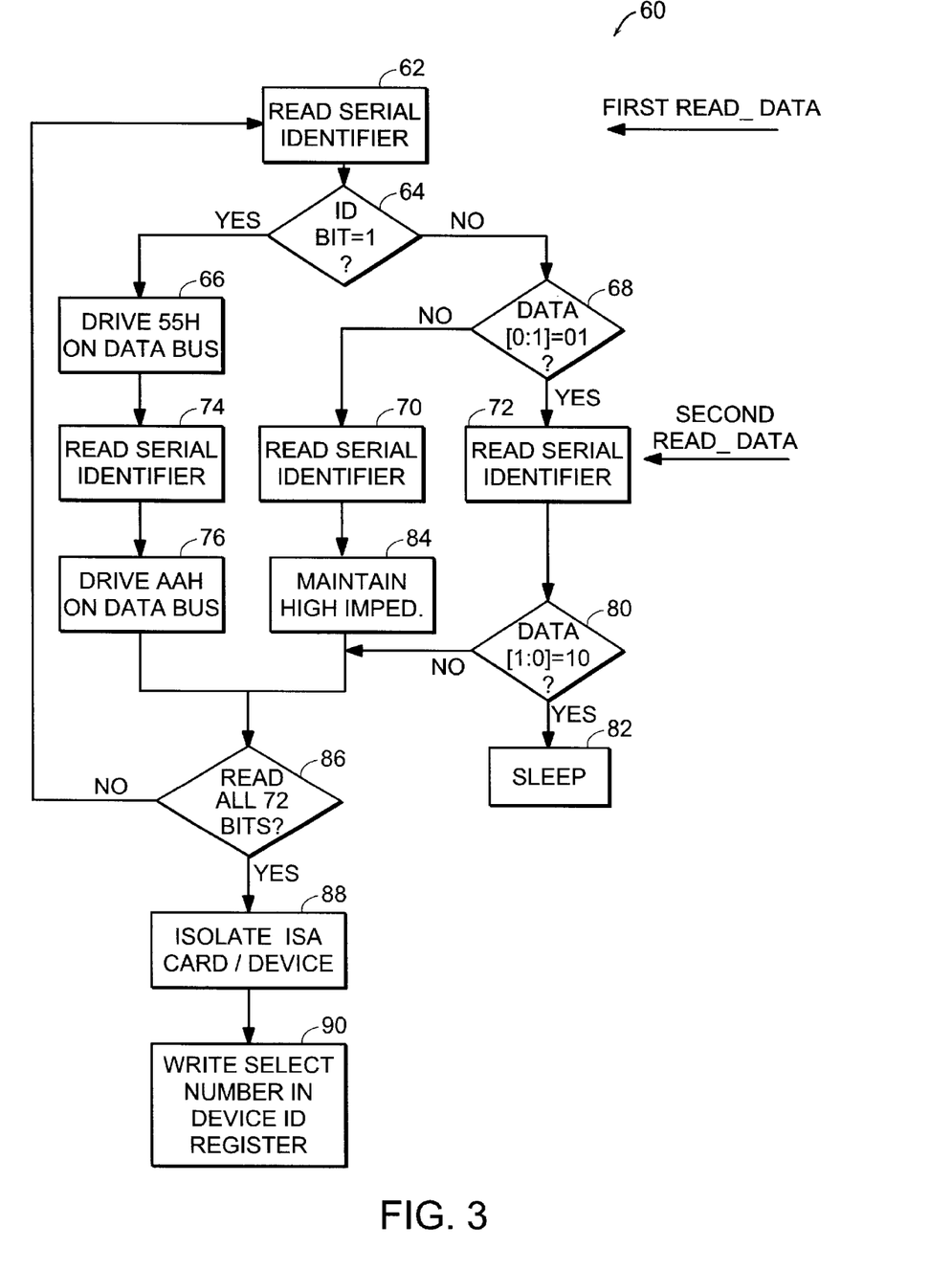
FIG. 3 is a flow diagram of state operations within the configuration control unit which uniquely identifies each ISA plug and play peripheral device and attributes identification numbers to respective device identification registers within both the south bridge and the ISA peripheral devices.

Referring to FIGS. 2 and 3, the various state operations used to isolate and assign a unique identifying number, or card select number, to identification registers 52 are shown in the flow diagram 60. Diagram 60 illustrates the operations used to isolate one Plug and Play ISA peripheral device. The operations are repeated until all Plug and Play ISA peripheral devices have been isolated, whereupon a command can be issued to a card control register and a unique identifying number can be written to a configuration register assigned to the peripheral device as well as device identifying registers 52 found within southbridge 26. The isolation and identifying routine begins by writing a series of write cycles to an address port at location e.g., 0x0279. This series of write cycles signals the Plug and Play protocol that auto configuration is enabled. The Plug and Play peripheral device will respond with a series of reads from the read data port and, more specifically, responds by reading a first bit of a serial identifier register contained within each of the peripheral devices. The serial identifier register for each peripheral device contains a 72-bit unique non-zero value composed of two 32-bit fields and an 8-bit checksum. The first 32-bit field is a vendor identifier value, and the other 32-bit field is a unique serial number assigned by the vendor unique to only that particular peripheral device. By reading the first bit of the serial identifier register 62, a comparison is made by the shadowing comparator (shown in FIG. 2) to determine if the first identifier bit is a binary 1 value, as shown by decision block 64. If so, the peripheral device assigned to that serial identifier register will drive the data bus with a 0x55H value to complete a first I/O read cycle 66. If the identifier bit is 0, then the peripheral device assigned to that register places its data bus output driver into a high impedance state. All peripheral devices in a high impedance state will check the data bus during the first I/O read cycle to sense if another peripheral device is driving a value corresponding to a 55H bit pattern. Regardless of whether the data bus of the ISA bus signals yield information that another peripheral device is driving a 01 bit pattern, a second read operation occurs on the read data port, as indicated by reference numerals 70 and 72. During this second I/O read of the card that has driven the 0x55H value 74, that card will now drive an alternate bit pattern of 0xAAH value, as shown by block 76. All peripheral devices having a high impedance output will check the data bus during the second read operation to sense if another card is driving the data bus to a 10 value 80. If the peripheral device having a high impedance output senses another card driving the data bus with the appropriate 10 value, then that card will cease to participate in the current iteration of card isolation and will be placed in a sleep state 82. If a peripheral device is driving the ISA bus, or if that device is in a high impedance output state 84 and did not sense another peripheral device driving the data bus, then it should prepare for the next pair of I/O read cycles. That peripheral device will shift the serial identifier associated with that device by one bit and uses the shifted bit to decide its next response.

The above sequence is repeated for the entire 72-bit serial identifier 86. If not all 72 bits have been read from a serial identifier register, then the process is repeated until they have been read. However, once all 72 bits have been read, then only one Plug and Play ISA peripheral device will remain, and that device is now said to have been isolated 88. The isolated card will receive a card select number command at address port value 0x06, whereupon a write to the addressed port value will set a device identification number or card select number within an 8-bit register attributed to that peripheral device. Additionally, the very same card select number will be written into a corresponding device identification register 52 within southbridge 26 (see FIG. 2). The writing of a select number to the isolated ISA peripheral device is shown as reference number 90. Once the peripheral device is assigned a number, that device will be placed in a sleep state and will no longer participate in subsequent iterations of isolation protocol 60. Accordingly, protocol 60 is repeated for each peripheral device, and eventually the entire 72 pairs of read sequences will be undertaken without any serial identification registers yielding a "1" bit. At this stage, the auto configuration protocol will note that all peripheral devices have been isolated and a unique identifying number written to corresponding registers within both the adapter card or peripheral device, as well as in the corresponding device identifying register shown in FIG. 2.

Figure 4:
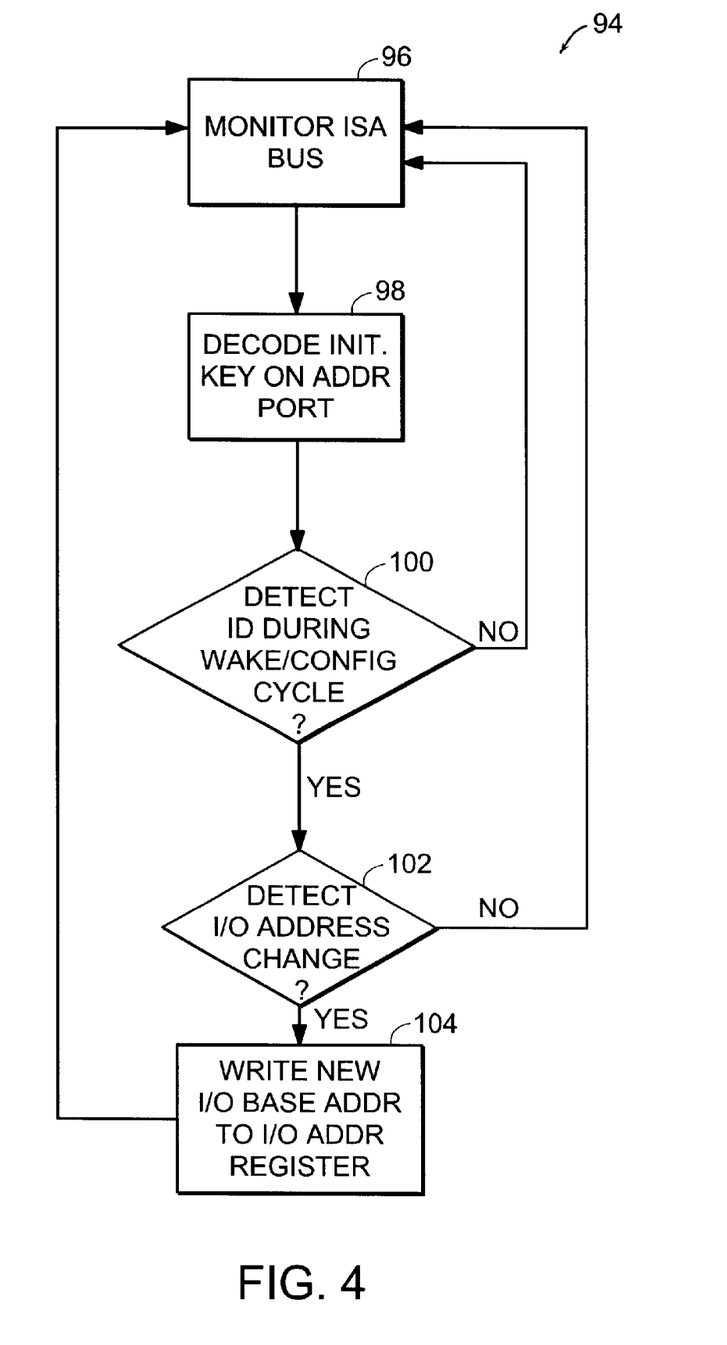
FIG. 4 is a flow diagram of state operations within the configuration control unit which, upon receiving a configuration command (i.e., WAKE command), detects base address modifications to a peripheral device that matches the write data following the configuration command, and then writes the new base address change to I/O address registers within both the south bridge and the ISA peripheral devices.

FIG. 4 illustrates various operations and states within configuration control unit 44, shown in FIG. 2. The operations or states are represented as a flow diagram 94, wherein the ISA bus is monitored for various commands or transactions 96 by the configuration control unit, or shadowing comparator therein. It is noted that during state 96, all of the various peripheral devices are in a sleep state and have been isolated and identified with a unique identifying number. To change the sleep state to a configuration state, an initialization key is forwarded to the address port as shown by step 98. Thereafter, a Wake command can be detected. This command will selectively enable one or more peripheral devices to enter either the isolation or configuration states based on the write data following the Wake command, and the value of the identifying number stored in each card configuration register and device identifying register within the southbridge. Peripheral devices leave the sleep state in response to the Wake command when the value of the write data bits of the Wake [CSN] command matches the identifying number of the peripheral device stored within the configuration register of the device as well as the device identification registers 52 (shown in FIG. 2). If the write data for the Wake command is not 0, then the unique peripheral device whose assigned identification number matches the parameter of the Wake command will enter the configuration state. Thus, if the identification number is detected upon issuance of the Wake command (block 100), then determination must be made whether the I/O address being configured has changed (block 102). That determination is carried forth by monitoring for a particular configuration address, e.g., 0x60 and 0x61 forwarded upon the address port. If the configuration address is detected, then the following write value dispatched upon the write data port will be the new base address for the identified peripheral device. That base address is then written into the configuration registers within the peripheral device, as well as the corresponding I/O address registers 54 within southbridge 26 (FIG. 2). The write operation is shown as reference numeral 104. Of course, if neither the unique identifying number or the configuration addresses (e.g., 0x60 or 0x61) are detected, then monitoring of the ISA bus continues.

FIG. 4 illustrates base addresses written to corresponding I/O address registers 54 of shadowing registers 48 (shown in FIG. 2). Once the appropriate registers are written with the appropriate base address, that address is maintained after the configuration cycle has been completed. The configuration cycle typically occurs during boot-up of the computer system, whereby configuration registers and corresponding shadowing registers are written to with unique information as to the corresponding peripheral device to which they are attributed.

Figure 5:
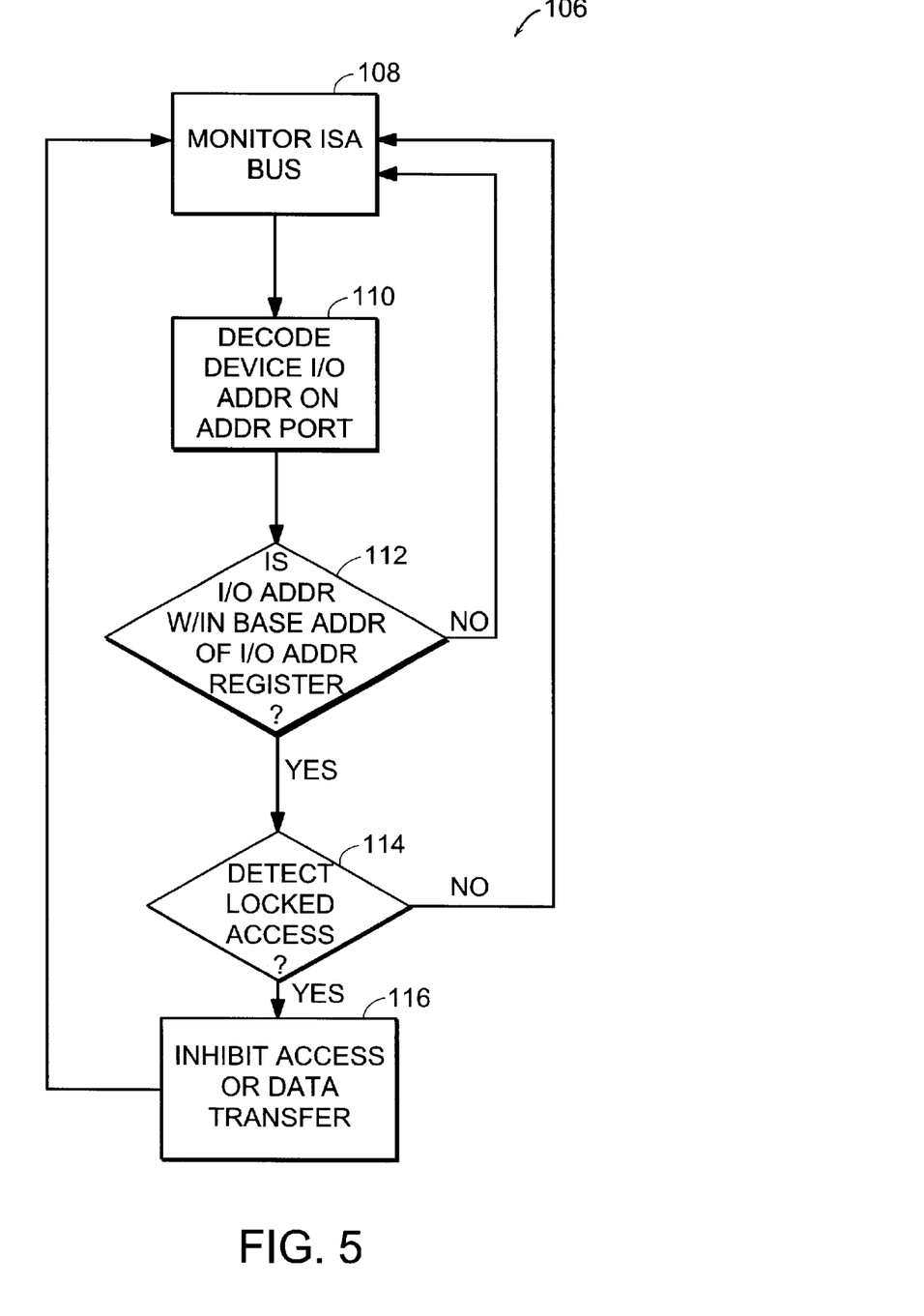
FIG. 5 is a flow diagram of state operations within security control unit which, upon receiving an ISA address to a base address shadowed within the I/O address registers of the south bridge, forwards a signal to the masking logic for blocking data at the south bridge from being written to or read from a locked ISA peripheral device.

FIG. 5 illustrates subsequent operations which occur after boot-up and after the configuration cycle is terminated. More specifically, FIG. 5 indicates various states and operations carried forth by security control unit 46 (shown in FIG. 2). The flow diagram 106 of the various states begins by monitoring the ISA bus (block 108). When an I/O address is detected on the address port 110, then determination must be made whether that I/O address is within a base address of the I/O address registers, as shown by reference numeral 112. If so, then it is determined that the I/O address is to a securable device configured with a particular securable base address stored within the I/O address registers. Determination must then be made on whether the black box has issued a lock or unlock signal attributed to the peripheral device being accessed. Determination is shown as reference numeral 114. If the lock signal associated with a particular peripheral device slot is asserted, then access to (i.e., addressing and/or data transfer) to or from the particular peripheral device is masked by the masking logic. Inhibiting access to the locked base address is shown as reference numeral 116. Of course, if the securable base address is not detected or the lock signal is not asserted, then it is assured that the securable device can be accessed without employing any security measures.

Various modifications and changes may be made as would be obvious to a person skilled in the art having the benefit of this disclosure. For example, secured access can be obtained to any relocated Plug and Play device, and not simply to those devices located on the ISA bus. Furthermore, the present shadow registers can automatically track the address changes of related peripheral devices, such as Plug and Play devices. The shadow registers can thereby prevent a potential security breach of unauthorized users who attempt to change a peripheral device address via, e.g., an indexed register modification. The shadow registers will dynamically change with changes to the indexed registers to prevent unauthorized user's attempts to access a peripheral device address via an indexed register change. It is intended that the following claims be interpreted to embrace all such modifications and changes and, accordingly, the specification and drawings are to be regarded in an illustrative rather than a restrictive sense.

What is claimed is:

1. A computer system, comprising:

a microprocessor;

a plug and play peripheral device located on a printed circuit board separate from another printed circuit board on which the microprocessor resides, wherein the peripheral device comprises a base address which is secured against access;

a shadowing comparator coupled to detect modifications to the base address upon receiving a configuration command issued by the computer system;

an address register coupled to the shadowing comparator for storing the modified base address; and masking logic operably coupled to the address registers for preventing accesses to the modified base address of the peripheral device.

2. The computer system as recited in claim 1, wherein said shadowing comparator, said address register and said masking logic are embodied upon a bus interface unit that is coupled between a bus on which the microprocessor is connected and another bus on which the peripheral device is connected.

3. The computer system as recited in claim 1, wherein said shadowing comparator comprises identification logic for identifying the peripheral device with a unique identifier number placed within the address register corresponding to the peripheral device.

4. The computer system as recited in claim 3, further comprising write logic coupled between the shadowing comparator and the address register for writing the modified base address to the address register if the configuration command is followed by data corresponding to the unique identifier number.

5. The computer system as recited in claim 1, wherein the peripheral device comprises an ISA plug and play adapter card.

6. The computer system as recited in claim 1, further comprising:

a keyboard; and a storage unit operably coupled between the keyboard and the masking logic for forwarding an unlock signal to the masking logic if a stored password within the storage unit favorably compares with a password that is either an encrypted password or a password entered upon the keyboard.

7. The computer system as recited in claim 6, wherein the masking logic allows access to the base address of the peripheral device upon receiving the unlock signal.

8. A computer system, comprising:
a keyboard;
a plurality of peripheral devices responsive at select times to entry upon the keyboard; and
a security control unit operably linked to a peripheral bus on which a secured group of the plurality of peripheral devices are coupled, and wherein the security control unit is adapted to detect a change in the I/O addresses associated with the secured group of peripheral devices and to prevent access to the secured group of peripheral devices before and after the I/O addresses associated therewith are changed.

9. The computer system as recited in claim 8, wherein the plurality of peripheral devices comprise a plug and play ISA adapter card.

10. The computer system as recited in claim 8, further comprising address registers coupled to the security control unit for storing said change in the I/O address associated with respective said plurality of peripheral devices.

11. The computer system as recited in claim 8, further comprising:
a storage unit coupled to the keyboard for forwarding an unlock signal if a stored password within the storage unit favorably compares with a password entered upon the keyboard; and
masking logic coupled between the security control unit and the peripheral bus for granting access to the secured group of peripheral devices during times when the masking logic receives the unlock signal.

12. The computer system as recited in claim 8, wherein the security control unit comprises a protection comparator which compares an address dispatched upon the peripheral bus with the I/O addresses stored within the address registers to prevent access to the peripheral device corresponding to the address register containing an I/O address which matches with the address dispatched upon the peripheral bus.

13. The computer system as recited in claim 8, wherein the security control unit is contained upon a bus interface unit coupled between the peripheral bus and a processor local bus.

14. A method for securing a peripheral device within a computer system, the method comprising:
associating an I/O address of a plug and play peripheral device as one that is secured;
detecting a change to the I/O address;
storing the changed I/O address;
decoding the changed I/O address whenever access to the peripheral device is attempted; and
preventing said access by associating the changed I/O address as one that remains secured.

15. The method as recited in claim 14, wherein said associating comprises configuring a device identification register with a first identification number unique to the peripheral device, and configuring an I/O address register with a first I/O address of the peripheral device.

16. The method as recited in claim 15, wherein said storing comprises re-configuring the device identification register with a second identification number dissimilar from the first identification number upon relocating the peripheral device.

17. The method as recited in claim 15, wherein said storing comprises re-configuring the I/O address register with a second I/O address dissimilar from the first I/O address upon relocating the peripheral device.

18. The method as recited in claim 17, wherein said recalling comprises extracting the second I/O address from the I/O address register.

19. The method as recited in claim 17, wherein said preventing comprises masking access to the first I/O address before the I/O address is changed and masking access to the second I/O address after the I/O address has been changed.

20. The method as recited in claim 17, wherein said preventing comprises masking reading of data or writing of data upon a peripheral bus on which the peripheral devices are connected before the I/O address is changed and after the I/O address has changed.

* * * * *